(12) United States Patent
Seymour et al.

(10) Patent No.: US 7,964,837 B2
(45) Date of Patent: Jun. 21, 2011

(54) PHOTOVOLTAIC INVERTER INTERFACE DEVICE, SYSTEM, AND METHOD

(75) Inventors: Eric Seymour, Fort Collins, CO (US); Jack A. Gilmore, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 755 days.

(21) Appl. No.: 11/967,933

(22) Filed: Dec. 31, 2007

(65) Prior Publication Data
US 2009/0167097 A1 Jul. 2, 2009

(51) Int. Cl.
*H01H 19/00* (2006.01)

(52) U.S. Cl. ............... 250/214 R; 250/214.1; 320/128; 320/140; 136/291

(58) Field of Classification Search ............. 50/214 R, 50/214.1; 320/128, 140; 136/291–293
See application file for complete search history.

(56) References Cited

U.S. PATENT DOCUMENTS

| | | | |
|---|---|---|---|
| 3,986,097 A | 10/1976 | Woods | |
| 4,025,862 A | 5/1977 | Gautheron | |
| 4,054,827 A | 10/1977 | Reimers | |
| 4,080,646 A | 3/1978 | Dietrich | |
| 4,128,793 A | 12/1978 | Stich | |
| 4,161,023 A | 7/1979 | Goffeau | |
| 4,678,983 A | 7/1987 | Rouzies | |
| 4,748,311 A | 5/1988 | Thomas | |
| 4,768,096 A | 8/1988 | Cannella et al. | |
| 5,270,636 A | 12/1993 | Lafferty | |
| 5,451,962 A | 9/1995 | Steigerwald | |
| 5,781,419 A | 7/1998 | Kutkut | |
| 5,923,100 A | 7/1999 | Lukens et al. | |
| 5,932,994 A | 8/1999 | Jo et al. | |
| 6,115,273 A | 9/2000 | Geissler | |
| 6,266,260 B1 | 7/2001 | Zahrte | |
| 6,404,655 B1 | 6/2002 | Welches | |
| 6,625,046 B2 | 9/2003 | Geissler | |
| 6,812,396 B2 | 11/2004 | Makita | |
| 6,844,739 B2 | 1/2005 | Kasai et al. | |

(Continued)

FOREIGN PATENT DOCUMENTS

JP 05-025890 A 2/1993

(Continued)

OTHER PUBLICATIONS

Seymour, Eric, "Device System and Method for Coupling Multiple Photovoltaic Arrays", U.S. Appl. No. 12/189,187, filed Aug. 10, 2008, commonly assigned to assignee.

(Continued)

*Primary Examiner* — Seung C Sohn
(74) *Attorney, Agent, or Firm* — Neugeboren O'Dowd PC; Sean R. O'Dowd

(57) ABSTRACT

A photovoltaic system, method and apparatus are disclosed. In an exemplary embodiment, the system includes a first and second inputs adapted to couple to a first and second rails of a photovoltaic array; an inverter configured to convert DC power from the photovoltaic array to AC power; and an interface portion coupled to the first and second inputs and the inverter, the interface portion configured to isolate at least one of the first and second inputs from the inverter and to modulate an application of a voltage from the photovoltaic array to the inverter so as to increase a load on the photovoltaic array and to reduce the voltage applied from the photovoltaic array to the inverter.

19 Claims, 6 Drawing Sheets

U.S. PATENT DOCUMENTS

| | | |
|---|---|---|
| 6,914,418 B2 | 7/2005 | Sung |
| 7,053,506 B2 | 5/2006 | Alonso |
| 7,292,419 B1 | 11/2007 | Nemir |
| 7,605,498 B2 * | 10/2009 | Ledenev et al. ............... 307/80 |
| 7,619,200 B1 | 11/2009 | Seymour et al. |
| 7,701,081 B2 | 4/2010 | Seymour |
| 7,710,752 B2 * | 5/2010 | West ............................ 363/71 |
| 7,719,140 B2 * | 5/2010 | Ledenev et al. ............... 307/80 |
| 7,733,670 B2 * | 6/2010 | Feng et al. ..................... 363/17 |
| 7,768,751 B2 | 8/2010 | Gilmore et al. |
| 2001/0004322 A1 | 6/2001 | Kurokami |
| 2001/0023703 A1 | 9/2001 | Kondo et al. |
| 2001/0048605 A1 | 12/2001 | Kurokami et al. |
| 2002/0105765 A1 | 8/2002 | Kondo et al. |
| 2003/0155887 A1 | 8/2003 | Bourilkov et al. |
| 2003/0172968 A1 | 9/2003 | Armer et al. |
| 2004/0211459 A1 | 10/2004 | Suenaga et al. |
| 2005/0139259 A1 | 6/2005 | Steigerwald |
| 2005/0180181 A1 | 8/2005 | Gaudreau et al. |
| 2005/0279402 A1 | 12/2005 | Ahn et al. |
| 2006/0221653 A1 | 10/2006 | Lai |
| 2006/0227472 A1 | 10/2006 | Taylor |
| 2008/0291706 A1 | 11/2008 | Seymour et al. |
| 2009/0032082 A1 | 2/2009 | Gilmore |
| 2009/0078304 A1 | 3/2009 | Gilmore |
| 2009/0167086 A1 | 7/2009 | Seymour |
| 2009/0167097 A1 | 7/2009 | Seymour et al. |
| 2009/0190275 A1 | 7/2009 | Gilmore |
| 2009/0217964 A1 | 9/2009 | Gilmore et al. |
| 2009/0283130 A1 | 11/2009 | Gilmore |
| 2010/0132758 A1 | 6/2010 | Gilmore |

FOREIGN PATENT DOCUMENTS

| | | |
|---|---|---|
| JP | 06-252434 A | 9/1994 |
| JP | 07-049721 | 2/1995 |
| JP | 11285260 | 10/1999 |
| JP | 2000358370 | 12/2000 |
| JP | 2002-319687 A | 10/2002 |
| JP | 2003-124492 A | 4/2003 |
| JP | 2004015941 | 1/2004 |
| JP | 2004343909 | 12/2004 |
| JP | 2005204485 | 7/2005 |
| JP | 2006187150 | 7/2006 |
| JP | 2007-201257 A | 8/2007 |
| KR | 20-2006-0021132 | 10/2006 |
| WO | 2007022955 | 1/2007 |

OTHER PUBLICATIONS

Gow, JA, "Photovoltaic Converter Sytem Suitable for use in Small Scale Stand-Alone or Grid Connected Applications", "Proceedings Electric Power Applications", Nov. 1, 2000, pp. 535-543, vol. 147, No. 6, Publisher: IEEE, Published in: US.

Kwon, Jung-Min, "Photovoltaic Power Conditioning System with Line Connection", "Transaction on Industrial Electronics", Aug. 1, 2006, pp. 1048-1054, vol. 53, No. 4, Publisher: IEEE, Published in: US.

Enslin, Johan, "Integrated Photovoltaic Maximum Power Point Tracking Converter", "Transaction on Industrial Electronics", Dec. 1, 1997, pp. 769-773, vol. 44, No. 6, Publisher: IEEE, Published in: US.

Walker, Geoffrey, "Cascaded DC-DC Converter Connection of Photovoltaic Modules", "Transactions on Power Electronics", Jul. 1, 2004, pp. 1030-1039, vol. 19, No. 4, Publisher: IEEE, Published in: US.

Bae, Jin Yong, "International Search Report and Written Opinion", "International Search Report", Jun. 25, 2009, Publisher: ISA/KR, Published in: Republic of Korea.

Gilmore, Jack Arthur, "U.S. Appl. No. 12/830,380 'Energy Conversion System with Fault Detection and Interruption'", Jul. 5, 2010, Published in: US.

Giffo-Schmitt, Beate, "PCT International Preliminary Report on Patentability re PCT/US08/077724", May 27, 2010, Published in: PCT.

Guinea, William, "PCT International Search Report re Application No. PCT/US09/065629", Feb. 12, 2010, Published in: PCT.

Pinheiro, "Dual Output . . ." IEEE, PESC 96, vol. 1, pp. 733-739, Jun. 1996.

Zhang, "Single-Phase . . . " IEEE APEC 95, vol. 1 pp. 434-439, Mar. 1995.

Dawin Electronics Corp., KR 10-2006-0100840 A, Sep. 21, 2006.

Gang, "Interleaved Three-Level . . . " IEEE APEC 04, vol. 2, pp. 1090-1095, Sep. 2004.

IEEE, "Std, 519-1992", Apr. 12, 1993, Publisher IEEE.

Junghan Kim, "a Study on Harmonic Elimination used Passive Filter and Active Filer", "KIIEE" 2001, Publisher: KIIEE.

Kahled H. Ahmed, "Passive Filter Design for Three-Phase Inverter Interfacing in Distributed Generation", "Electrical Power Quality and Utilization Journal", 2007, Page (s) abstract, Fig. 1-19, vol. 13, No. 2.

Timothy Cy Wang, "Output Filter Design for a Grid-Interconnected Three-Phase Inverter", "IEEE", 2003 Publisher: IEEE, Published in US.

Woo-Cheol Lee, "Design of Optimum Filter in Switching Amplifier", Master thesis of Hanyang University, 1988.12.

Notification of International Search Report and Written Opinion for PCT/US2008/064263 mailed Oct. 31, 2008.

Notification of International Search Report and Written Opinion for PCT/US2009/031549 mailed Aug. 17, 2009.

Notification of International Search Report and Written Opinion for PCT/US2008/072108 mailed Feb. 24, 2009.

International Search Report for PCT/US2008/077734 mailed Apr. 29, 2009.

Notification of International Search Report and Written Opinion for PCT/US2008/087078 mailed Jul. 9, 2009.

SunPower, "Surface Polarization . . . " SunTechnics SunReader, 4 pages, 2005.

* cited by examiner

PHOTOVOLTAIC INVERTER INTERFACE DEVICE, SYSTEM, AND METHOD

FIELD OF THE INVENTION

This invention relates generally to apparatus and methods for converting solar energy to electrical energy, and more specifically to apparatus and methods for more efficient conversion of solar energy to electrical energy.

BACKGROUND OF THE INVENTION

The transformation of light energy into electrical energy using photovoltaic (PV) systems has been known for a long time and these photovoltaic systems are increasingly being implemented in residential, commercial, and industrial applications. Although developments and improvements have been made to these photovoltaic systems over the last few years to improve their efficiency, the efficiency of the photovoltaic systems is still a focal point for continuing to improve the economic viability of photovoltaic systems.

Photovoltaic systems typically include, among other components, a photovoltaic array that generates DC power and an inverter that converts the DC power to AC power (e.g., single or three phase power). It is often desirable to design and operate photovoltaic arrays so that the voltage that is output is relatively high, and hence current is low, in order to reduce costs associated with high-current elements and to reduce energy losses.

Photovoltaic arrays that include crystalline (e.g., monocrystalline or polycrystalline) silicon, for example, may operate in an open load state at 1200 Volts and amorphous silicon may operate in an open load state at 1400 Volts. Although arrays are capable of applying high open loaded voltages, arrays rarely do so because once power is drawn from the arrays, the loaded voltage of the array drops substantially. For example, under loaded conditions, crystalline silicon arrays may operate at between 780 to 960 volts and amorphous silicon may operate around 680 Volts.

Inverters are available in a variety of voltage ratings to accommodate the infrequently encountered unloaded voltage conditions of the array. But inverters that are rated for higher voltages typically cost more and operate less efficiently than inverters that are designed to operate at lower voltages. And as a consequence, inverters are often designed with silicon that is less efficient and costlier than silicon that could be used if the inverter did not have to be designed to handle high, open load voltages.

For example, inverters incorporating silicon rated for voltages around 1400 Volts incur substantially more losses, and cost substantially more than inverters that utilize silicon that is rated for 1200 Volt applications. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the invention may be characterized as a photovoltaic system including a first and second inputs adapted to couple to a first and second rails of a photovoltaic array. In this embodiment, an inverter is configured to convert DC power from the photovoltaic array to AC power, and an interface portion, which is coupled to the first and second inputs and the inverter, is configured to isolate at least one of the first and second inputs from the inverter and to modulate an application of a voltage from the photovoltaic array to the inverter so as to increase a load on the photovoltaic array and to reduce the voltage applied from the photovoltaic array to the inverter.

In another embodiment the invention may be characterized as a method for interfacing a photovoltaic array with an inverter. The invention in this embodiment includes electrically isolating the photovoltaic array from the inverter, applying an initial voltage at an output of a photovoltaic array, modulating a load placed on the photovoltaic array so as to provide a reduced voltage at the output of the photovoltaic array, and utilizing the reduced voltage to apply power to the inverter.

In yet another embodiment, the invention may be characterized as a photovoltaic interface including two inputs capable of coupling to a photovoltaic array, the inputs configured to receive an initial voltage applied by the photovoltaic array. In addition, the interface in this embodiment includes two outputs capable of coupling to an inverter, the outputs configured to apply an operating voltage to the inverter. And a switching segment in this embodiment is configured to gradually place a load across the two inputs so as to reduce the initial voltage applied by the photovoltaic array to the operating voltage of the inverter.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
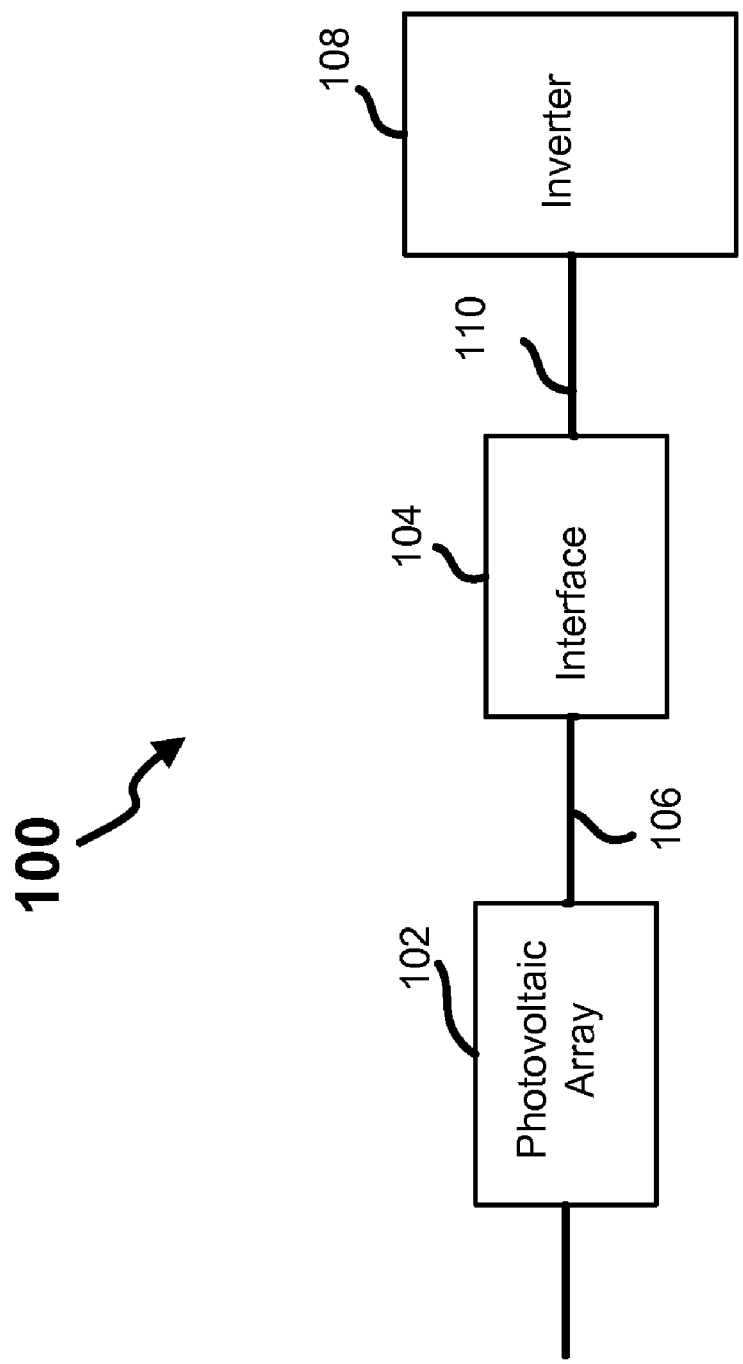
FIG. 1 is a block diagram depicting an exemplary embodiment of a photovoltaic system.

Referring now to the drawings, where like or similar elements are designated with identical reference numerals throughout the several views, and referring in particular to FIG. 1, it is a block diagram depicting a photovoltaic system 100, that includes a photovoltaic array 102 coupled to an inverter 108 via a photovoltaic (PV) interface 104.

In general, the photovoltaic array 102 converts solar energy to DC electrical power, which is converted to AC power (e.g., three-phase power) by the inverter 108. And the PV interface 204 generally operates to enable the inverter 108, which is designed to operate at lower voltages, to be utilized in connection with the PV array 102 that operates at least a portion of the time (e.g., while unloaded) at a voltage that exceeds the designed operating voltage of the inverter 108.

In many embodiments, the PV interface 104 is a low duty factor device, which operates only briefly during startup and/or shut down, to gradually connect or disconnect the PV array 102 to the inverter 108. In some embodiments for example, the PV interface 104 operates for one, or just a few, second(s) during startup and/or shut down. In some implementations for example, the duty cycle of a switching segment in the interface is pulse width modulated from a low to a high duty cycle (e.g., from 10% to 100%) to gradually load the PV array 102, and as a consequence, reduce a voltage of the array 102 from an initial voltage (e.g., unloaded voltage) to a lower voltage (e.g., approximately an optimal voltage of the inverter 108).

Once the PV array 102 is loaded, and the voltage of the PV array is reduced from its initial voltage, the interface 104 couples the PV array 102 to the inverter 108 and the switching segment of the interface 104 is removed from operation. As a consequence, in many embodiments, the inverter 108 is not exposed to the potentially damaging open load voltages of the PV array 102, and during steady state operation (e.g., after the voltage of the PV array 102 is reduced), the effect of the switching segment of the interface 104 upon the efficiency of the system 100 is insubstantial. In several embodiments, however, the efficiency of the system 100 is substantially improved relative to the prior art because the inverter 108 is realized by silicon that is designed to operate at voltages that are lower than the initial (e.g., unloaded voltage) of the PV array 102.

As discussed further herein, in some embodiments the photovoltaic array 102 is a bipolar array, and in many of these embodiments, at least a portion of the array 102 is disposed so as to operate at a positive voltage with respect to ground while another portion of the array 102 operates below ground. But this is certainly not required, and in other embodiments the photovoltaic array 102 is a monopolar array, which in some variations operates at voltages substantially higher than ground or lower than ground.

In some embodiments, the cells in the array 102 include crystalline (e.g., monocrystalline or polycrystalline) silicon that operates in an open load state at 1200 Volts and operates in a loaded state between 780 and 960 Volts. And in other embodiments the array includes cells comprising amorphous silicon that operates in an open load state at 1400 Volts and a loaded state around 900 Volts. One of ordinary skill in the art will appreciate, however, that the photovoltaic array 102 may include a variety of different type photovoltaic cells that are disposed in a variety of different configurations. For example, the photovoltaic cells may be arranged in parallel, in series or a combination thereof.

As discussed further herein, several embodiments of the interface 104 beneficially enable low cost and efficient inverters to be utilized in connection with efficient, high voltage PV arrays. For example, instead of utilizing 1400 Volt silicon (e.g., in IGBTs of the inverter 108) to accommodate 1400 Volt open-load PV voltages, in some embodiments 1200 Volt silicon is implemented in the inverter 108, which is roughly half the cost of 1400V silicon and is much more efficient.

Figure 2:
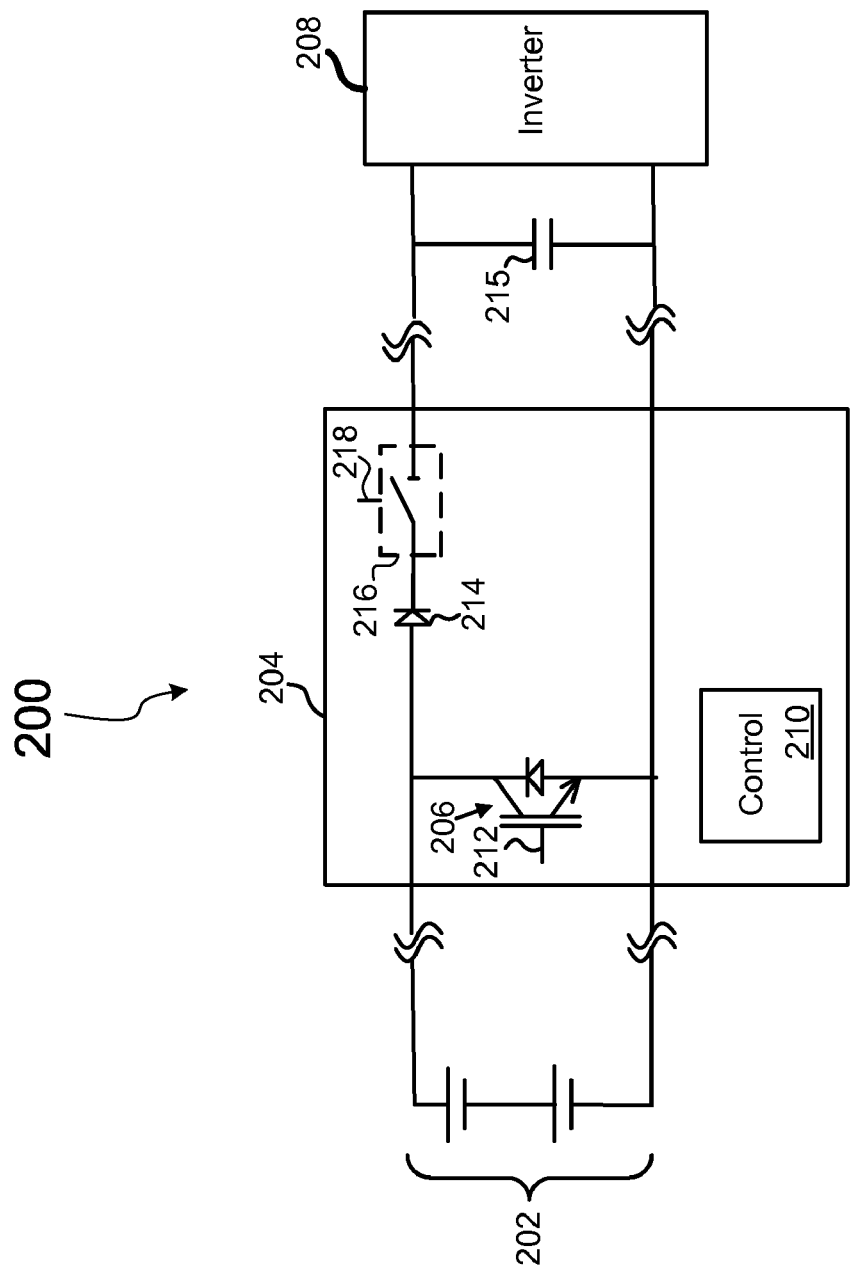
FIG. 2 is a schematic representation of an exemplary embodiment of the system described with reference to FIG. 1.

Referring next to FIG. 2, shown is a schematic representation of an exemplary embodiment of the system 100 described with reference to FIG. 1. As shown in the system 200 depicted in FIG. 2, a bipolar photovoltaic array 202 is coupled to an inverter 208 via an exemplary interface 204 that includes a switching segment comprising a shunt switch 206 arranged and configured to couple the inverter 208 to the array 202 without the inverter 208 being exposed to the potentially damaging open-load voltages of the array 202.

As shown, the shunt switch 206 is disposed across the positive and negative rails of the array 202 and is coupled to a control segment 210 of the interface 204 by an input lead 212. In addition, a diode 214 is arranged in series, along a positive rail of the system 200, with a contactor 216, which is coupled to the control segment 210 by a control lead 218. Although not depicted, the negative rail of the interface in many implementations also includes a DC contactor to disconnect and connect the negative output of the array 202 to the inverter 208.

In many embodiments, the switch 206 is an insulated-gate bipolar transistor (IGBT) disposed so that a collector-emitter current path of the IGBT is coupled between the positive and negative rails of the interface 204, and the gate of the switch 206 is coupled to the control lead 212. In other embodiments, however, the switch 206 is implemented by other switching technologies without departing from the scope of the claimed invention.

In some embodiments, the control segment 210 is realized by a processor that is configured to execute instructions stored in a memory, but this is not required, and in other embodiments the control segment 210 is realized by hardware. It is also contemplated that the control segment 210 in yet other embodiments is implemented by a combination of hardware and software. It should also be recognized that the depiction of the control segment 210 is merely logical and that the interface 204 may be controlled by control components that are distributed within and/or outside of the interface 204.

In some embodiments the interface 204 is utilized during start-up to bring the inverter 208 online with the array 202 while the array 202 is generating an initial voltage that is potentially damaging to the inverter 208. And in other embodiments, the interface 204 is employed during shut down to remove the inverter 208 from the array while the array 202 is still applying a substantial voltage across the rails of the system 200. And in yet other embodiments, the interface 204 is used both during start-up and shut down.

During an exemplary start-up process, the capacitor 215 is charged to approximately an operating voltage (e.g., approximately 900 Volts) of the inverter 208 (e.g., using soft start switch gear not shown or the PV array 202), and the inverter 208 is turned on with the contactor 216 open. The shunt switch 206 is then closed so that the array 202 is shorted out, and then the contactor 216 is closed before current is forced into the inverter 208 by opening the shunt switch 206. The diode 214 in this embodiment prevents damage to the bus capacitor 215 while the shunt switch 206 is closed.

During shut down, in one embodiment, the shunt switch 206 is closed so as to prevent a substantial amount of current from flowing through the contactor 216 to the inverter 208. The contactor 216 is then opened 216 to isolate the inverter 208 from the array 202, and then the shunt switch 206 is opened.

Figure 3:
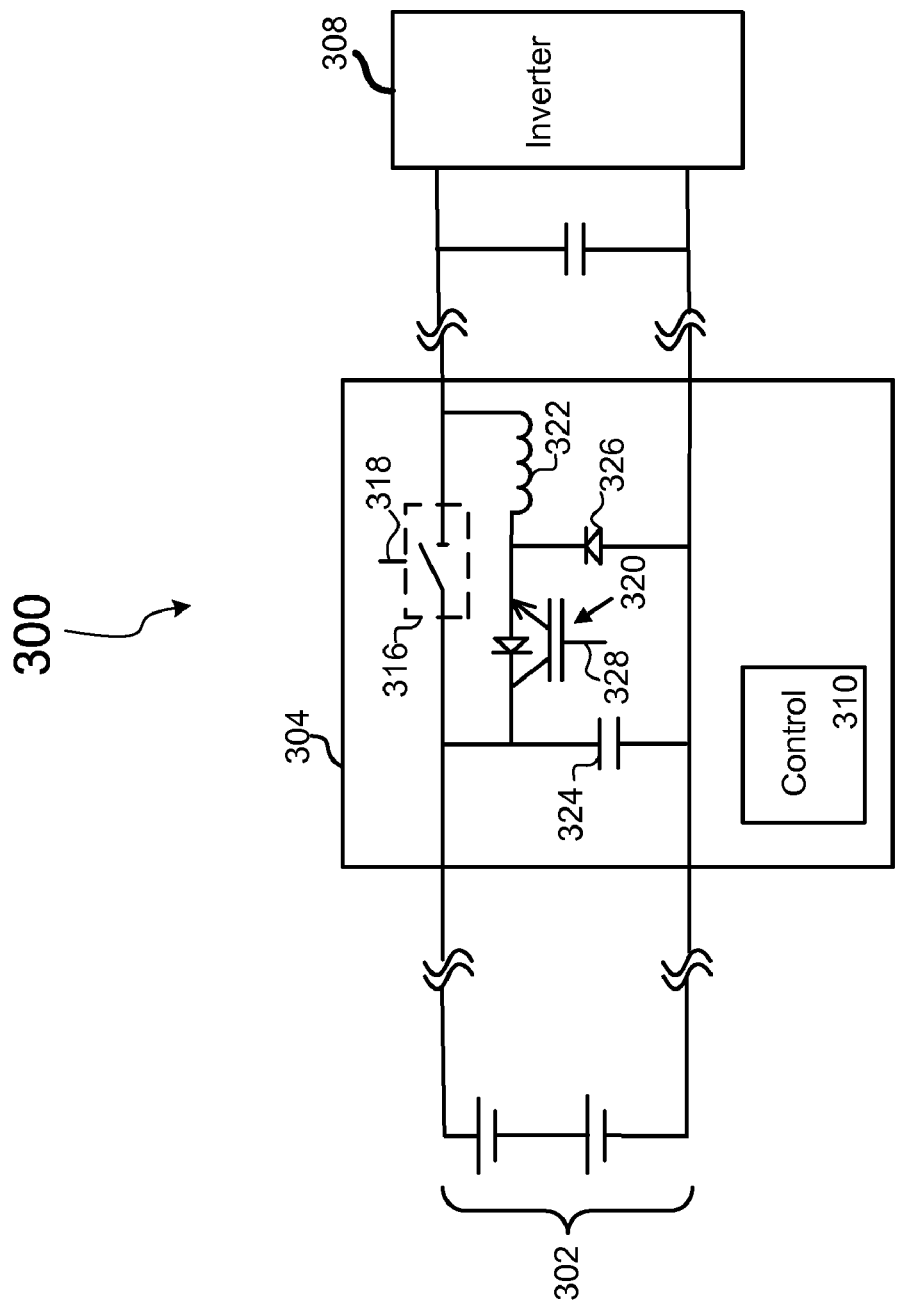
FIG. 3 is a schematic representation of another embodiment of the system described with reference to FIG. 1.

Referring next to FIG. 3, shown is a schematic representation of another embodiment of the system described with reference to FIG. 1. As shown, the system 300 in this embodiment includes an array 302, which is coupled to an inverter 308 via an interface 304 that is realized in part by a switching segment, which includes a switch 320 that is arranged in series along a positive rail of the system 300. As depicted, the switch 320 is arranged, along with an inductor 322, in a path that is parallel to a DC contactor 316, which is disposed along the positive rail of the interface 304. Also shown are a capacitor 324 that is coupled between the positive and negative rails of the interface 302 and a circulating diode 326 that is coupled between a junction of the switch 320 and the inductor 322. In this embodiment, a control segment 310 is coupled to both an input lead 328 of the switch 320 and a control lead 318 of the contactor 316.

Figure 4A:
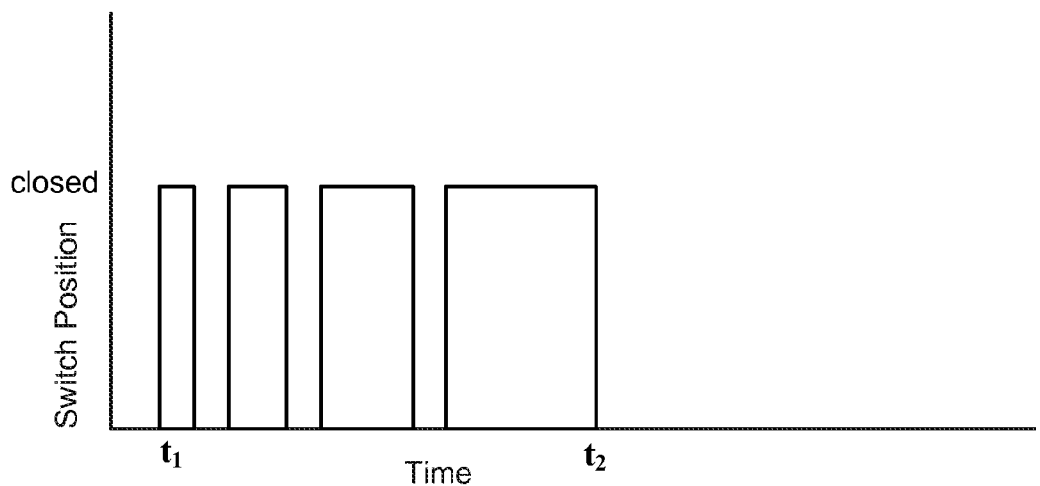
FIG. 4A is a graph depicting, as a function of time, a position of the switch depicted in FIG. 3.
Figure 4B:
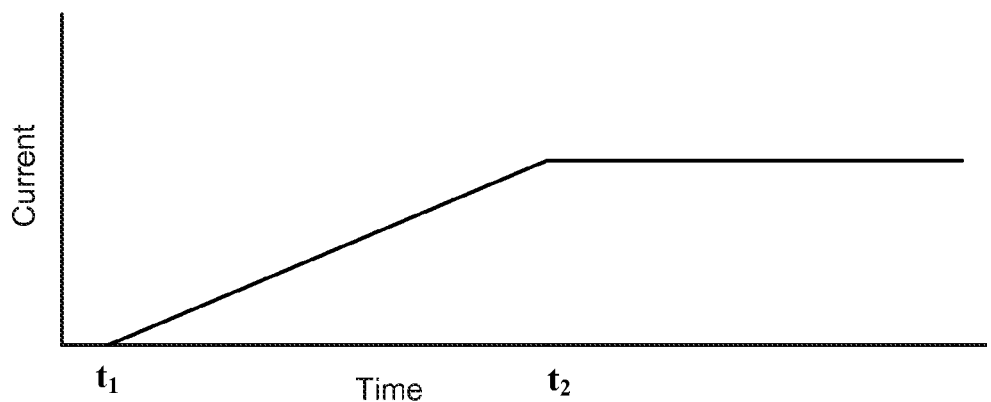
FIG. 4B is a graph depicting, as a function of time, current flowing from the array to the inverter depicted in FIG. 3.
Figure 4C:
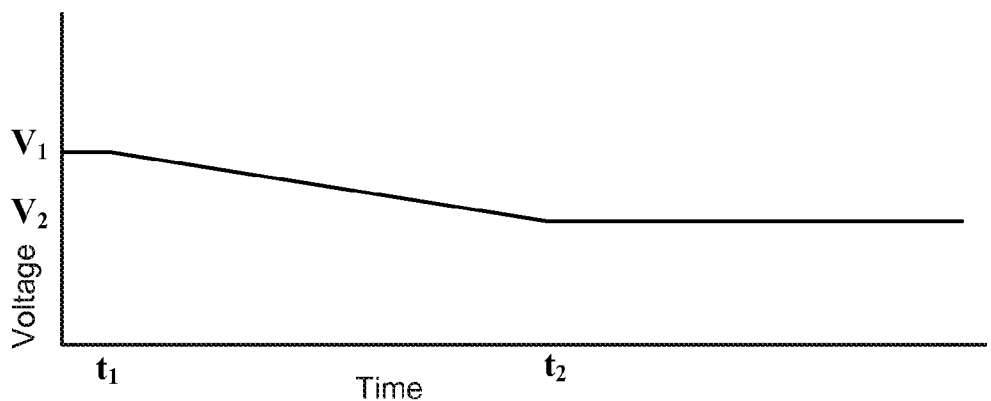
FIG. 4C is a graph depicting, as a function of time, a voltage of the photovoltaic array depicted in FIG. 3.

In many modes of operation, the interface 304 depicted in FIG. 3 operates to gradually couple the array 302 to the inverter 308 so that the inverter 308 is not exposed to potentially damaging voltages (e.g., open load voltages) of the array 302. Referring to FIGS. 4A, 4B and 4C, for example, shown are graphs depicting, as a function of time, a position of switch 320, current flowing from the array 302 to the inverter 308, and the voltage of the array 302, respectively.

As shown, initially when the array 302 is exposed to sunlight, but is not yet coupled to the inverter 308, the contactor 316 is open and the array 302 applies an open load voltage $V_1$ to the interface 304, but no current flows from the array 302, through the interface 304, to the inverter 308. At a time $t_1$ the switch 320 is closed briefly, as shown in FIG. 4A; current begins to flow through the interface 304 as depicted in FIG. 4B; and as shown in FIG. 4C, the voltage output by the array 302 begins to drop below $V_1$.

As shown in FIG. 4A, in this exemplary mode of operation, the signal 328 to the switch 320, and hence the closure of the switch 320, is pulse-width modulated so that the switch 320 is closed for successively longer amounts of time between times $t_1$ and $t_2$. As depicted in FIGS. 4A, 4B, and 4C, while the duty cycle of the switch 320 is increased between times $t_1$ and $t_2$, the current through the interface 304, from the array 302 to the inverter 308, continues to increase, and the voltage at an output of the array 302 continues to drop from $V_1$ to $V_2$. In one embodiment, the switch 320 is pulse-width modulated so that the duty cycle of the switch 320 varies from approximately 10% to 100% from time $t_1$ and $t_2$, and the switch 320 is pulsed (and closed) approximately 100 times over approximately a one second time period between $t_1$ and $t_2$, but this is certainly not required, and in other embodiments, other modulation schemes are utilized.

In many embodiments, once the voltage output by the array 302 is reduced to a desirable level (e.g., a level that is tolerable to the inverter 308 and/or an optimal level for power transfer), the contactor 316 is closed and the switch 320 is opened so that the voltage $V_2$ output from array 302 is applied to the inverter 308. In some embodiments for example, the voltage $V_1$ is approximately 1200 VDC and $V_2$ is approximately 900 VDC.

In some embodiments, the interface 304 is also configured to decouple the inverter 308 from the array 302 while the array 302 is applying a substantial voltage (e.g., full-load voltage) to the inverter 308. In these embodiments, the switch 320 is closed, and then the contactor 316 is opened so as to enable the switch 320 to gradually decouple the array 302 from the inverter 308 by being switched from a high duty cycle (e.g., 100% duty cycle) to a low duty cycle (e.g., 0%).

Figure 5:
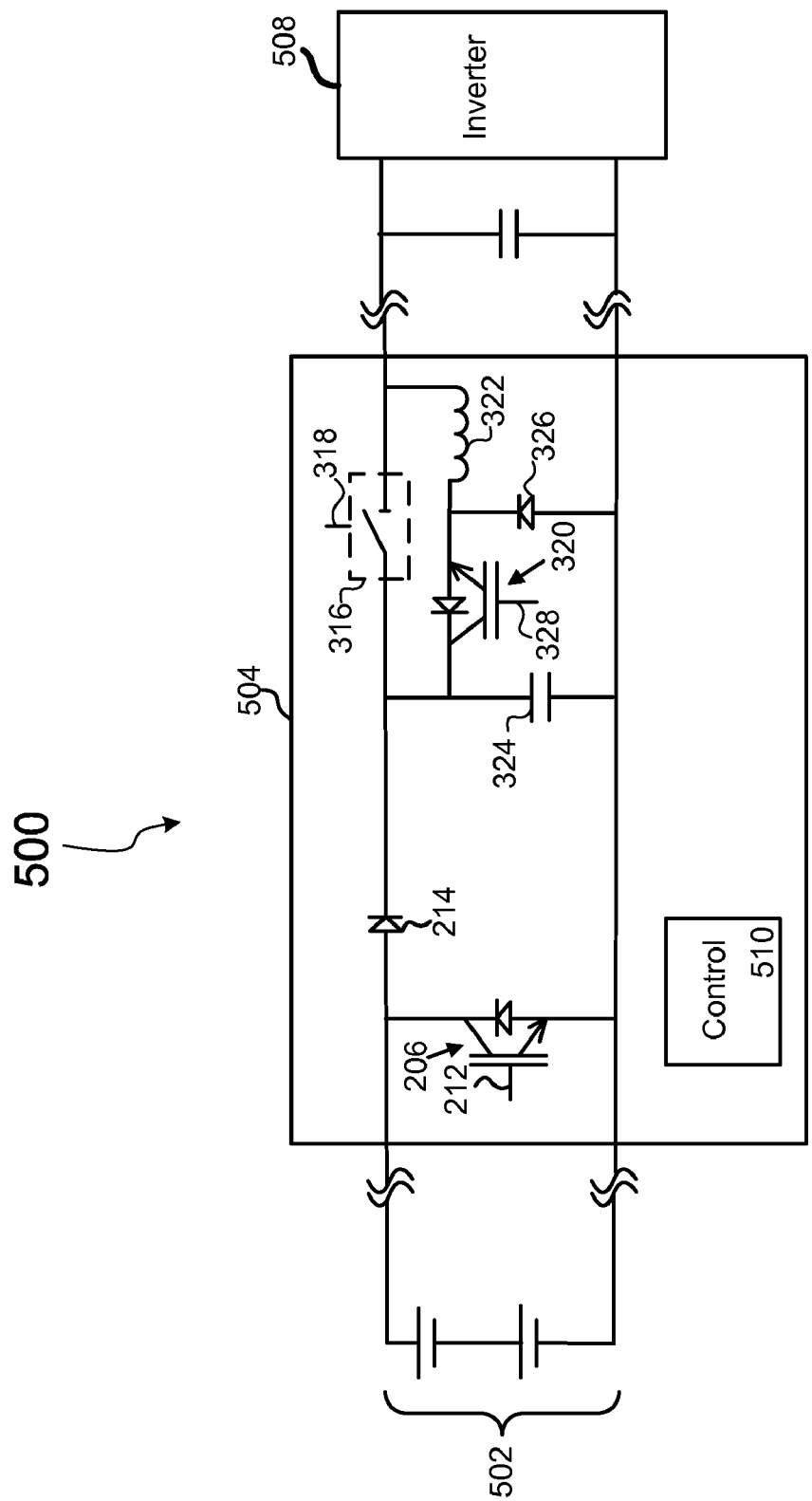
FIG. 5 is a schematic representation of yet another exemplary embodiment of the system described with reference to FIG. 1.

Referring next to FIG. 5, shown is a schematic representation of yet another exemplary embodiment of the system 100 described with reference to FIG. 1. As depicted, the interface 504 in the system 500 includes both a shunt switch 206 and a series-arranged switch 320 controlled by control segment 510. In this embodiment the series switch 320 is utilized during startup to gradually couple the inverter 508 to the array 502 while the array is applying a voltage to the rails of the system 500 in the manner described with reference to FIGS. 3 and 4, and the shunt switch 306 is used to decouple the inverter 508 from the array 502 as described with reference to FIG. 2.

Although either the series switch 320, discussed with reference to FIGS. 3 and 4, or the shunt switch 206, discussed with reference to FIG. 2, may be utilized for both startup and shut down procedures, in this embodiment, the shunt switch 206 is capable of more quickly removing the array 502 from the inverter 508, and the series switch 320 is generally better suited to more smoothly coupling the array 502 to the inverter 508.

Figure 6:
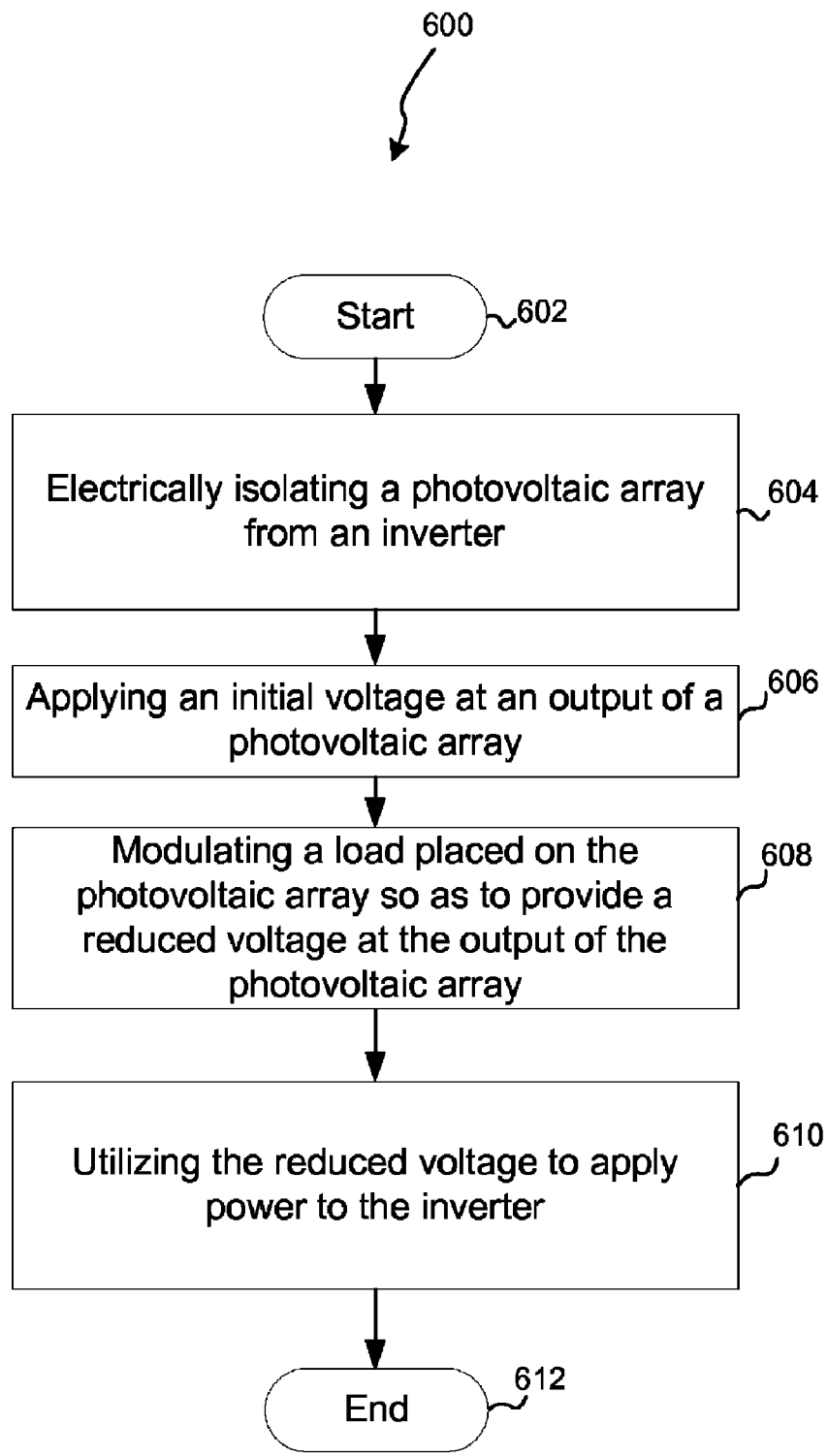
FIG. 6 is a flowchart 600 depicting an exemplary method that may be carried out in connection with the embodiments discussed with reference to FIGS. 1-5.

Referring next to FIG. 6, shown is a flowchart 600 depicting an exemplary method that may be carried out in connection with the embodiments discussed with reference to FIGS. 1-5. As shown, initially a photovoltaic array (e.g., array 102) is electrically isolated from an inverter (e.g., inverter 108) while the array is applying a voltage (e.g., an open-load voltage) at the output of the array (Blocks 602, 604 and 606). A load placed on the photovoltaic array is then modulated so as to provide a reduced voltage at the output of the photovoltaic array, and the reduced voltage is utilized to apply power to the inverter (Blocks 608, 610, and 612).

As discussed, in some embodiments a switch segment that includes a shunt switch (e.g., shunt switch 206) is utilized to modulate a load that is placed on the array. And in other embodiments a switching segment that includes a series-arranged switch (e.g., series-arranged switch 320) is utilized to modulate a load that is placed across the array.

In conclusion, the present invention provides, among other things, a system and method for interfacing with a photovoltaic array. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A photovoltaic system comprising:
   a first and second inputs adapted to couple to a first and second rails of a photovoltaic array;
   an inverter configured to convert DC power from the photovoltaic array to AC power; and
   an interface portion coupled to the first and second inputs and the inverter, the interface portion configured to isolate at least one of the first and second inputs from the inverter and to modulate an application of a voltage from the photovoltaic array to the inverter so as to increase a load on the photovoltaic array and to reduce the voltage applied from the photovoltaic array to the inverter.

2. The system of claim 1, wherein the interface portion includes
   a series switch arranged in parallel with an isolation switch, each of the series and the isolation switches coupled to one of the first and second inputs, the isolation switch configured to open so as to isolate the one of the first and second inputs from the inverter, and the series switch configured to be capable of closing for successively longer times so as to modulate the application of the voltage from the photovoltaic array to the inverter.

3. The system of claim 2, wherein the series switch includes an insulated gate bipolar transistor.

4. The system of claim 1, wherein the interface portion includes:
a shunt switch arranged across the first and second inputs, the shunt switch configured to close for successively shorter times so as to modulate the application of the voltage from the photovoltaic array to the inverter.

5. The system of claim 1, wherein the interface portion includes:
a series switch arranged in parallel with an isolation switch, each of the series and the isolation switches coupled to one of the first and second inputs, the isolation switch configured to open to isolate the one of the first and second inputs from the inverter, and the series switch configured to close for successively longer times so as to modulate the application of the voltage from the photovoltaic array to the inverter; and
a shunt switch arranged across the first and second inputs, the shunt switch configured to close for successively longer periods of time so as to modulate the application of the voltage from the photovoltaic array to the inverter.

6. The system of claim 5, wherein the series switch is adapted to close for successively longer times so as to successively increase a load on the photovoltaic array, and the shunt switch is configured to close for successively longer periods of time so as to decrease an inverter load placed in the photovoltaic array.

7. The system of claim 1, wherein the interface portion is configured to reduce the voltage applied from the photovoltaic array to the inverter from a voltage that is greater than 1000 Volts to a voltage that is less than 1000 Volts.

8. A method for interfacing a photovoltaic array with an inverter comprising:
electrically isolating the photovoltaic array from the inverter;
applying an initial voltage at an output of a photovoltaic array;
modulating a load placed on the photovoltaic array so as to provide a reduced voltage at the output of the photovoltaic array; and
utilizing the reduced voltage to apply power to the inverter.

9. The method of claim 8, wherein the electrically isolating a photovoltaic array from an inverter includes isolating one rail of the photovoltaic array from the inverter.

10. The method of claim 8, wherein the initial voltage applied at the output of the photovoltaic array exceeds 1300 Volts and wherein the reduced voltage is less than 1000 Volts.

11. The method of claim 8, wherein the modulating includes successively placing the load on the photovoltaic array for longer periods of time.

12. The method of claim 8, including electrically coupling, after the reduced voltage from the photovoltaic array reaches a desirable voltage, the photovoltaic array to the inverter.

13. The method of claim 12, wherein the initial voltage is higher than a design-voltage of the inverter.

14. The method of claim 8, including:
shunting current away from the inverter so as to reduce the voltage applied from the photovoltaic array to the inverter; and
electrically isolating the photovoltaic array from the inverter, subsequent to the shunting, so as to remove the inverter from the photovoltaic array.

15. A photovoltaic interface device comprising:
two inputs capable of coupling to a photovoltaic array, the inputs configured to receive an initial voltage applied by the photovoltaic array;
two outputs capable of coupling to an inverter, the outputs configured to apply an operating voltage to the inverter; and
a switching segment configured to gradually place a load across the two inputs so as to reduce the initial voltage applied by the photovoltaic array to the operating voltage of the inverter.

16. The photovoltaic interface of claim 15, wherein the switching segment includes a series switch arranged in parallel with an isolation switch, each of the series and the isolation switches coupled to one of the first and second inputs, the isolation switch configured to open so as to isolate the one of the first and second inputs from the inverter, and the series switch configured to be capable of closing for successively longer times so as to modulate the application of the voltage from the photovoltaic array to the inverter.

17. The photovoltaic interface of claim 16, wherein the switching segment includes a shunt switch disposed across the first and second inputs.

18. The photovoltaic interface of claim 16, wherein the switching segment includes:
a series switch arranged series with at least one of the first and second inputs, the series switch configured to be duty cycled from a low duty cycle to a high duty cycle so as to gradually couple the photovoltaic array to the inverter.

19. The photovoltaic interface of claim 18 wherein the switching segment includes:
a shunt switch disposed across the first and second inputs, the shunt switch configured to close so as to enable the inverter to be removed from the photovoltaic array without exposing the inverter to damaging currents.

* * * * *